Patented July 11, 1950

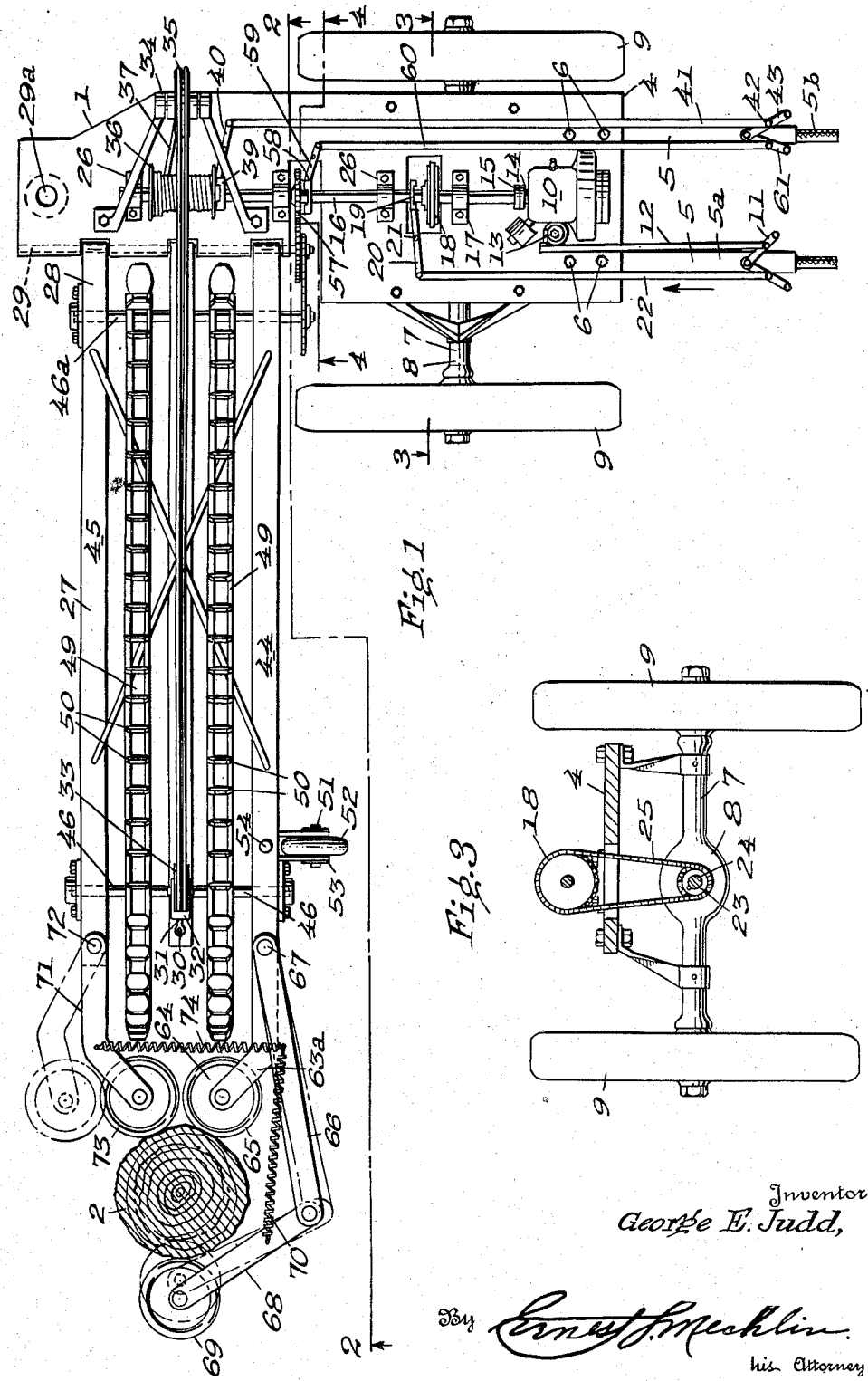

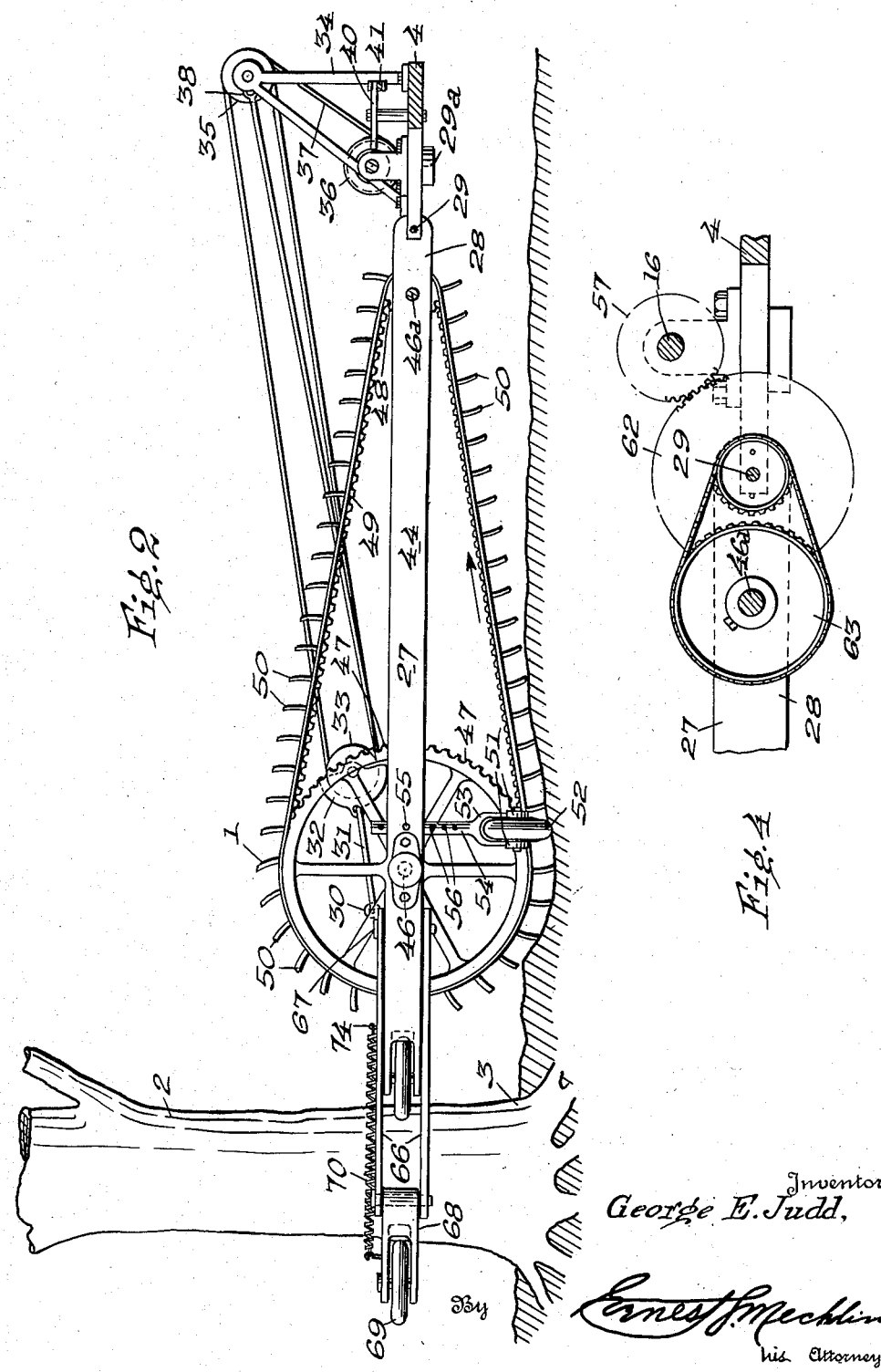

2,514,766

UNITED STATES PATENT OFFICE 2,514,766

ORCHARD CULTIVATOR

George E. Judd, Fort Myers, Fla.

Application May 17, 1946, Serial No. 670,445

6 Claims. (Cl. 97—136)

1

This invention pertains to a hoeing machine or mechanism adapted for orchard cultivation.

During orchard cultivation, particularly during the process of plowing between the rows of trees, the turned over earth is directed or piled against the trunks of the trees and successive plowings only add to the mounds formed at the bases of the trees. An object, therefore, of the present invention is to provide an improved orchard cultivator which may be movably connected to a trunk of a tree and comprising a means selectively operated for moving earth away from a trunk of a tree.

Another object of the present invention is to provide, in an orchard cultivator, an adjustable anchor means at or adjacent an end of the cultivator so as to closely engage a wide range of tree trunks of various sizes.

A further object of the invention is to provide, in an orchard cultivator, a supporting means, adjustable in a vertical direction to control the depth of the cut effected by the cultivator.

The above and numerous other objects of the present invention will become apparent from the succeeding description considered together with the accompanying drawings, the latter of which illustrate an exemplified form of the invention and wherein:

Figure 1 is a plan view of an orchard cultivator embodying the present invention.

Figure 2 is a transverse sectional view taken along the lines 2—2 of Figure 1, looking in the direction of the arrows.

Figure 3 is a transverse sectional view taken along the lines 3—3 of Figure 1, looking in the direction of the arrows; parts of a true view are omitted for clarity.

Figure 4 is an enlarged sectional view taken along the lines 4—4 of Figure 1, looking in the direction of the arrows.

Referring now in detail to the drawings, wherein like reference characters indicate like parts, the numeral 1 is employed to designate, in a somewhat general manner, an improved cultivator so arranged and constructed, to move about a trunk 2 of a tree and move earth away from adjacent the tree base 3. The cultivator comprises a base plate or frame 4 having one end thereof provided with handle bars or shafts 5 spaced at a convenient distance apart transversely of the frame and secured thereto through the medium of bolts 6 or any other attaching means. In supporting relation with the frame is a running gear or carriage 7 generally comprising a housing 8 (see Figure 3) which encases a conventional transmission (not shown) the latter of which is operatively connected to a pair of laterally spaced rubber tired wheels 9.

Mounted upon the frame adjacent one end thereof is a power unit 10 which may conveniently be a commercial type of a small internal combustion engine. Pivotally carried by the left hand shaft 5a is a throttle or lever 11 which, through the medium of a link or rod 12, is connected to a carburetor 13 of the power unit. When the power unit has been started a manipulation of the throttle or lever 11 will operate the conventional valves (not shown) in the engine to thereby accelerate or decelerate the engine and control the power generated by the engine. Coming out of the forward end of the power unit is a power take-off or auxiliary shaft 14 which is firmly connected to a flexible coupling 15. A power or main shaft 16, journaled in a suitable bearing 17 mounted on the frame, has one end thereof connected rigidly to the flexible coupling so that any rotative motion imparted to the shaft 14 will be reflected in the main shaft. Arranged to move selectively in response to a motion of the main shaft is a wheel, sprocket or pulley 18 which, in inoperable position, is arranged to remain stationary but, through the action of a clutch 19, is made to be operatively coupled to the power shaft and thus form an operative or rotative part thereof. Operatively connected to the clutch 19 is a lever 20 pivoted intermediate its ends to the frame through the pin 21. The lever 20 in turn is arranged to be moved about its pin by an operating rod 22 which is also pivotally connected to the left hand shaft 5a. As will be noted, a movement of the operating rod in a direction away from the shaft, as indicated by the arrow, will result in an engagement by the clutch to thereby impart a rotary motion to the wheel 18. Spaced below and desirably in alignment with the pulley is an auxiliary wheel, sprocket or pulley 23 fixed with respect to a shaft 24 which extends out of the carriage housing and is operatively connected to a train of gears (not shown) of conventional design and arrangement for driving the tired wheels 9. Any flexible means 25 is trained about the main pulley 18 and auxiliary wheel 23 to impart a rotary motion from the former to the latter. When, therefore, the clutch is engaged, the cultivator is a self-propelled unit but it is the present intention to employ the power unit to propel the cultivator only at such times as the cultivator is employed in the process of removing a mound of earth from about the base of a tree. Other means of locomotion hereinafter mentioned is contemplated to move the cultivator from one orchard to another or for that matter from one tree to another. The power shaft continues in a direction away from the handle bars desirably as a line shaft beyond the main sprocket or pulley to be supported by a plurality or preferably a pair of bearing stands 26. Movable means have been associated with the cultivator frame for moving earth away from a base of a tree and toward this end there is provided a transversely extending beam 27 having one end 28 thereof pivotally connected through the medium of a pin 29 to the frame at a location away from the handle bars. When moving the cultivator from one location to another it is deemed advisable to elevate the beam so that the components thereof will be clear of the ground. During such moving process a tractor or any other such unit (not shown) is hooked on to a hitch 29a and through this hitch the leading or front end of the cultivator is supported. In order, therefore, to arrange an elevating means for the beam there is provided adjacent an outer end of the beam an eye bolt 30 onto which is fastened a link 31. Secured to the link is a casing 32 carrying one or more freely rotatable pulleys 33. Upstanding from the frame of the cultivator is a bracing or standard 34 supporting, in a position above the frame, one or more sheaves 35. Associated with the far or forward end of the line shaft is a relatively movable winding drum 36 about which is wound a cable 37 leading from the drum and trained about the sheave or sheaves and pulley or pulleys to have its outer free end anchored to the standard as at 38. Any rotative movement of the drum in a clockwise direction when viewing the showing of Figure 2 will result in the effective length of the cable being shortened and the beam being raised or elevated or pivoted about pin 29. The winding drum is arranged to be coupled to the line shaft through a friction clutch 39 operated by a crank arm 40 which is pivotally mounted to the frame. Leading from the crank arm is an operating rod 41 extending longitudinally of the frame in spaced relation thereto and having a free end 42 thereof pivotally connected to an operating handle 43 mounted on the right hand bar 5b (see Figure 1).

The beam generally comprises a near or inner leg or branch 44 and a far or outer leg or branch 45 both of which as parts of the beam carry journals or axles 46 and 46a spaced apart longitudinally thereof or transversely of the cultivator. The axle 46 may be of an idling type but the axle 46a is desirably of the driving type as hereinafter made apparent. Mounted on the idling axle and arranged to move therewith or independently thereof are a pair of toothed sprocket wheels 47 spaced apart transversely of the beam or longitudinally of the cultivator. The driving axle also carries a pair of toothed sprocket wheels 48 in radial alignment with but preferably of smaller diameter than the companion wheels 47 so that a large toothed wheel is paired with a smaller toothed wheel. Trained over companion or paired tooth wheels are a pair of endless belts or conveyors 49 each having a series or a plurality of spaced hoes 50 firmly secured thereto so that any rotative motion imparted to the driving smaller wheel will cause a counter-clockwise motion of the larger sprockets and the hoes of the conveyors below the axes of the journals to move toward the frame as indicated by the arrow in Figure 2. The flight of the hoes will therefore be at all times in a direction so as to move earth away from a base of a tree toward the frame of the cultivator. The inner surface of each endless belt 49 is also preferably toothed so that a positive and definite driving interlock between the sprockets and belts will be effected.

Some means is believed necessary to control the depth of the cut effected by the hoes and also function as a support for the free or outer end of the beam during a hoeing operation and accordingly there is provided an auxiliary running gear 51 comprising a tired traction wheel 52 pivotally mounted in a yoke 53. The yoke shank 54 extends through a suitable aperture in the inner leg 44 and arranged to bisect the yoke shank is a removable pin 55. The yoke shank has extending along its length a series of openings 56 so that the pin 55 may be extended through any one of these openings to thereby determine the height of the beam from the top of the ground. Since the cultivator is arranged to move in a counter-clockwise direction about a tree trunk it will be noted that the auxiliary running gear is in rear of the hoes and thus its disposition will definitely determine the depth of cut effected by the hoes.

In order to impart a motion to the driving axle or journal 46a there is provided a mechanism coupling the line shaft to the driving axle and as exemplary of such a mechanism the line shaft is furnished with a driving gear 57 which may be coupled directly to the line shaft by a clutch mechanism 58 operated or controlled by a link 59 pivotally mounted on the frame and having, extending therefrom, an operating rod 60. The operating rod is pin-connected to an operating handle 61 mounted on the right hand shaft 5b so that by a proper manipulation of the handle 61 the clutch 58 may be selectively engaged or disengaged. The driving gear is in constant mesh with a combination gear and sprocket 62 the latter of which is chain-connected to a larger sprocket 63 fixed with respect to driving axle or journal (see Figure 4).

The present invention includes an anchor means by which a cultivator may move in a somewhat fixed path about a tree and as illustrative of such an anchor means the inner leg is extended somewhat beyond the reach of the outer leg to be offset at an angle in a direction toward the outer leg as at 63a. This offset leg portion carries at its outer or free extremity a roller 64 which may be tired with a rubber shoe 65 since it is arranged to engage or roll around the tree trunk as clearly illustrated in Figure 1.

Extending at an angle to the inner branch or leg is a pair of parallel bars 66 positioned in straddling relation to the related leg and having one end thereof pivotally secured thereto by means of a pintle 67. The outer or free ends of the parallel bars are arranged in overlapping relation and pivotally connected to an auxiliary leg 68. This auxiliary leg is normally directed inwardly toward the extended plane of the beam and has one of its ends bifurcated to receive a pivotally mounted second roller 69 which is arranged to engage the trunk of a tree at a position removed or around from the contact between the roller 64 and the tree trunk. Various means may be employed to urge the roller 69 toward the roller 64 and therefore a preferred means is disclosed as a common tension coil spring 70 having one end anchored to the auxiliary leg and another end secured to one of the parallel bars. By this simple arrangement the roller 69 is at all times urged toward the roller 64 to bind a tree trunk therebetween. Now with only the two described rollers the beam would not maintain a fixed relation with a tree so for that reason the outer leg at or near its extremity carries an offset extension 71 through a pivot pin 72. This extension is also provided with a roller 73 similar in design to the rollers 64 and 69. Accordingly, a tripod or triangularly arranged anchor is formed by the three rollers to form a definite and positive guiding mechanism for maintaining the cultivator in a fixed path about the tree. Since the offset extension is also pivotally mounted another or a second simple tension spring 74 has one end secured to the offset extension and another end secured to one of the parallel bars so that the roller 73 will also be resiliently urged toward the fixed roller 64. These springs 70 and 74 also afford a certain range of adjustability in the anchor mechanism so that the tree trunk need not be perfectly cylindrical and also need not be of a given caliber or diameter.

From the above it will be noted that various changes and alterations may be made to the illustrated construction without departing from the spirit of the invention and scope of the appended claims.

I claim:

1. In a ground moving machine, the combination of, a frame supported by a running gear, drive means on said frame arranged to be selectively connected to said running gear, a beam outstanding from one side only of and pivoted to said frame, rotatable means carried by said frame and arranged to be selectively rotated by said drive means, elevating means connected to said beam at a location removed from said frame and to said rotatable means, earth moving means carried by said beam and actuated by said drive means, and spring-pressed tripod anchor means pivotally mounted on an end of said beam for engagement with a trunk of a tree.

2. In a ground moving machine, the combination of, a frame supported by a running gear, power means on said frame selectively arranged to motivate said running gear, a beam extending transversely of said frame from one side only thereof and having one end pivotally secured thereto, rotatable means carried by said frame, means connecting said rotatable means and beam for elevating said beam, said rotatable means selectively arranged for rotation by said power means, earth moving means carried by said beam and selectively arranged for movement by said power means, and spring-pressed anchor means at an end of said beam removed from said frame for engagement with a trunk of a tree.

3. In a ground moving machine, the combination of, a frame supported by a running gear, power means carried by said frame and operatively connected to said running gear, a beam extending transversely from one side only of and pivotally connected to said frame, earth moving means carried by said beam for moving earth toward said frame, vertically adjustable means associated with said beam for determining the depth of cut of said earth moving means, and spring-pressed tripod means pivotally mounted on an end of said beam for engagement with a trunk of a tree.

4. In a ground moving machine, the combination of, a frame supported by a running gear, power means carried by said frame and operatively connected to said running gear, a beam extending transversely from one side only of and pivotally connected to said frame, earth moving means carried by said beam for moving earth toward said frame, vertically adjustable means associated with said beam for determining the depth of cut of said earth moving means, and spring pressed anchor roller means carried by an end of said beam for engagement with a trunk of a tree.

5. In a ground moving machine, the combination of, a frame supported by a running gear, power means carried by said frame and operatively connected to said running gear, a beam extending transversely from one side only of and pivotally connected to said frame, earth moving means carried by said beam for moving earth toward said frame, vertically adjustable means associated with said beam for determining the depth of cut of said earth moving means, a roller connected to said beam, and a plurality of spring-pressed arms carrying rollers and pivotally connected to said beam; all of said rollers being arranged to contact a trunk of a tree for anchoring said machine to said tree.

6. In a ground moving machine, the combination of, a frame supported by a running gear, power means carried by said frame, a beam extending transversely from one side only of and pivotally connected to said frame, earth moving means carried by said beam for moving earth toward said frame, means connecting said power means and earth moving means, means connecting said power means and beam for elevating the latter, vertically adjustable means associated with said beam for determining the depth of cut of said earth moving means, and spring-pressed tripod means pivotally mounted on an end of said beam for engagement with a trunk of a tree.

GEORGE E. JUDD.

REFERENCES CITED

The following references are of record in the file of this patent:

UNITED STATES PATENTS

| Number | Name | Date |
|---|---|---|
| 342,453 | McLean | May 25, 1886 |
| 505,965 | Smyth | Oct. 3, 1893 |
| 1,120,179 | Blevins | Dec. 8, 1914 |
| 1,404,612 | Holtzclaw | Jan. 24, 1922 |
| 2,173,771 | Taylor | Sept. 19, 1939 |